United States Patent [19]

Mitsushima et al.

[11] Patent Number: 4,947,185

[45] Date of Patent: Aug. 7, 1990

[54] THERMAL PRINTING SYSTEM WITH AUTOMATIC CRUMBLED PAPER RELEASE

[75] Inventors: Susumu Mitsushima, Ise; Kiyoshige Ishiyama, Mie; Takeshi Okuno, Mie; Hiromitsu Ogita, Mie, all of Japan

[73] Assignee: Shinko Denki Kabushiki Kaisha, Tokyo, Japan

[21] Appl. No.: 369,399

[22] Filed: Jun. 21, 1989

[30] Foreign Application Priority Data

Jun. 21, 1988 [JP] Japan .............................. 63-81123[U]
Aug. 13, 1988 [JP] Japan .............................. 63-106524[U]

[51] Int. Cl.5 .............................................. G01D 15/10
[52] U.S. Cl. ................................ 346/76 PH; 400/120
[58] Field of Search ..................... 346/76 PH; 400/120

[56] References Cited

FOREIGN PATENT DOCUMENTS 0104353 6/1985 Japan .
0114872 6/1986 Japan .............................. 346/76 PH
0187750 11/1987 Japan .

*Primary Examiner*—Bruce A. Reynolds
*Assistant Examiner*—Huan Tran
*Attorney, Agent, or Firm*—Armstrong, Nikaido Marmelstein, Kubovcik & Murray

[57] ABSTRACT

In a thermal printing system having an automatic paper feeding mechanism paper may be misfed and become crumpled between one of a pair of spring biased pinch rollers and the platen of the printing machine. A mechanism is provided for automatically releasing pressure between the rollers and the platen, wherein a depression/release lever is provided with a cam disposed between supporting members of the pinch rollers, and the lever is actuated when a frame of the printing machine is raised to provide access to the machine, causing the cam to widen the space between the pinch rollers and the platen so that the crumpled paper can be easily removed.

5 Claims, 5 Drawing Sheets

THERMAL PRINTING SYSTEM WITH AUTOMATIC CRUMBLED PAPER RELEASE

BACKGROUND OF THE INVENTION

1. Field of the Invention

The present invention relates to a thermal printing system, and more particularly, to a thermal printing system which prints alphanumerical and/or graphic information, on a paper sheet cut into unified sheet size of A4, B5 or the like fed from a cassette case, by melting a film of printing ink applied on a plastic membrane by the heat imparted by a thermal head, which further comprises at least a means for selectively depressing or releasing a pair of pinch rollers against a platen, thereby allowing the user who operates the system to readily remove any paper crumpled between the platen and the pinch rollers.

2. Description of the Prior Art

Various types of thermal printing systems have been developed and are being widely used, which print a number of dots of printing ink corresponding to alphanumerical and/or graphic information printed by a thermal head of the printing system on a paper sheet, cut into unified size, by thermally melting a film of printing ink applied on the surface of a plastic membrane in a dried state at an ambient temperature. In these types of thermal printing systems, paper sheets for printing are supplied as a set of cut paper sheets each cut into such a unified size of A4, B5 or the like and are contained in cassette case each capable of receiving a number of paper sheets, say, 50 or 100, and these paper sheets are automatically fed or propelled as printing proceeds on. That is, a subsequent sheet in advancecd as soon as the preceeding paper sheet has finished being printed on, and the thus newly fed paper sheet is caught, in other words, squeezed between a front pinch roller and a rear pinch roller both of which are disposed as a pair, and the thus caught paper is depressed upon the surface of a platen and is subjected to printing. Through such type of printing systems are designed and manufactured such that the way of feeding successive paper sheets one after another from a paper cassette case to the pair of pinch roller is done automatically, sometimes such trouble may arise that the automatically feeding of the paper sheets becomes unsatisfactory and results in malfunction of the system such as crumpling of a fed paper sheet between the pinch roller or rollers and a platen, due to slight misalignment and/or minor difference in size between the paper sheets, and to a minor deviation in the dimension of parts or components of the system.

By taking these drawbacks in the prior art printing system into account, there has been conceived and developed such a device capable of removing a paper sheet which has actually been crumpled between the pair of pinch rollers as disclosed by Japanese Utility Model Application No. Sho 61(1986)-73966(Unexamined U. M. Publication No. Sho 62(1987)-187750).

This publication discloses a thermal printing system which comprises, as shown in FIG. 8, a platen 21, a pair of pinch rollers 23 each pinch roller of which is disposed to be freely rotatable on each of a pair of pinch levers 22 and capable of being depressed against or released from said platen 21. The aforesaid depressing and releasing action of this printing system is effected in such manner that the depression of the pinch rollers 23 against the platen 21 is done by a pinch roller lever tensioning spring 24 connected between both the swingable ends of the pinch roller levers 22 and the releasing of the depressed pinch rollers is effected by a manual releasing lever 25 rotatable about a pin as an axis of rotation.

This manual release level 25 is provided, at one end, with a rotary disc 26 which normally does not impart any force to the pinch roller levers 22, but acts to make the pinch rollers 23 move away from the platen 21, only when the manual release lever 25 is turned at a specified angle in a direction opposite to that for depressing the pinch rollers, namely, the pinch roller lever at the left side is turned clockwise and the pinch roller lever at the right side is turned opposite, that is, anticlockwise.

The publication also discloses, as another embodiment shown in FIG. 9, a thermal printing system provided with a depression/release lever 25' fixedly attached with a return lever 29 for returning aforesaid release lever 25', in which the return lever 29 acts to return the depression/release lever 25' when the return lever 29 contacts the lower frame 28 when the upper frame 27 is lowered onto the lower frame 28 for closing.

However, according to the thermal printing system dislosed by the above mentioned unexamined U. M. Publication No. Sho 62-187750, it is required for one who uses the system to manually operate the releasing lever 25, it becomes necessary for him to release the pinch rollers 23 in depressed state against the platen 21, so a person who is not skilled in operation cannot know the way of handling the depression/releasing lever unless he reads an operating manual of the device, or he is apt to involuntarily try to pull out the paper sheet P in a crumpled state without manipulating the releasing lever.

SUMMARY OF THE INVENTION

The present invention has been conceived and developed to solve the above-mentioned problems, and it aims to provide a thermal printing system which can prevent such a misuse and also to make it possible that a paper sheet in a crumpled state can be readily removed by such a mere simple action of opening the upper frame upward, by providing a mechanism which enables depression of the pinch rollers on the platen or releasing the depressed pinch rollers on the platen to be automatically set in connection with the opening or closing of the upper frame with respect to the lower frame of the system. Accordingly, an object of the present invention is to provide a thermal printing system for printing alphanumarical and/or graphic information on a cut paper sheet by melting the film of thermal printing ink applied on a plastic film by means of heat imparted by a thermal head, which system is attached with a device for automatically setting a platen and a pair of pinch rollers in a state capable of removing a paper sheet being crumpled between the platen and the pinch rollers.

Another object of the present invention is to provide a thermal printing system which has a mechanism enabling the user to manually remove crumpled sheet of paper by means of forming a gap between a platen and a pair of pinch rollers, by a mere upward opening of the upper frame from the lower frame of the system. A further object of the present invention is to provide a thermal printing system having a more simplified mechanism which enables ready removal of the crumpled paper sheet in more ready manner, merely by disposing a pinch roller depressing assembly including a platen and a pair of pinch rollers together with a depression/-release lever, on the lower frame and by swingably raising the upper frame.

Two measures were taken in the present invention to set the pinch rollers in the depressed state or released state by user's opening or closing action.

A first measure is to provide a depression/release lever which acts in response to the user's opening or closing action. In more detail, the front end of the depression/release lever will engage a part of the lower frame, when the upper frame is lowered down onto the lower frame as a "closed" state, then the lever is allowed to rotate accompanying rotation of a coaxially fixed cam means to move away from the pinch roller levers, thereby the pinch rollers are depressed under resilient force against the surface of the platen ready for normal printing.

On the other hand, if there arises crumpling of the fed paper sheet, if only the upper frame is raised upward away from the lower frame to set the system in "opened" state, the pinch roller lever will move away from the contact with the frame, and the depression/-release lever also rotates being urged by a tension spring, resulting in rotation of the cam coaxially fixed to the depression/release lever also thereby the space between the pair of pinch roller levers is widened allowing the pinch rollers to be released from their depression on the platen, thereby it becomes possible to take out the paper sheet being crumpled between these parts constituting the platen-pinch roller assembly. A second step measure can be taken as explained below. Components such as pinch rollers, a platen and means for depressing and releasing the pinch rollers are disposed at the lower frame side wherein a depression/release lever as said depressing and releasing means is made swingable and one lengthwise end is rendered possible to engage the lower face of the upper frame, while the other free end is provided with protrusions which act as a wedge or cam means and act to engage the inside face of each support pin of the pinch roller levers.

When these protrusions engage the support pins, they act to release the pinch rollers from the contact with the platen against the tension force imparted by a pinch roller lever tension spring. By virture of this construction, it is rendered, in case of paper sheet crumpling, to remove the crumpled paper sheets by forming a clearance between the platen and the pinch rollers by merely raising up the upper frame from the lower frame.

Explanation will now be made of the preferred embodiment of the present invention by referring to the following description.

PREFERRED EMBODIMENTS

First Embodiment

Explanation will be made now of a first embodiment of the present invention by referring to FIGS. 1 through 4 of the accompanying drawings.

Figure 1:
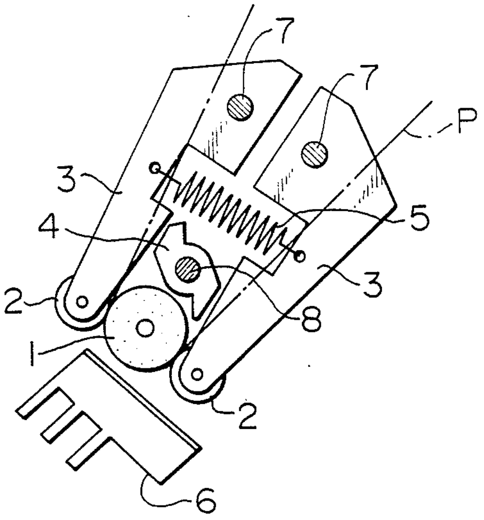
FIG. 1 is a schematic side view illustrating the cam and its relating parts of a first embodiment of the present invention when the upper frame is lowered down.
Figure 2:
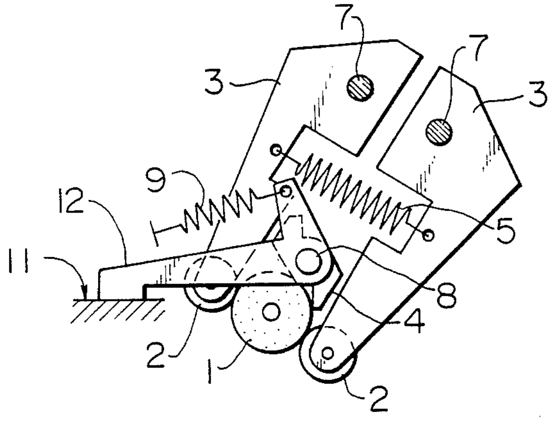
FIG. 2 is a schematic side view illustrating the depression/release lever and its relating parts of a first embodiment of the present invention when the upper frame is lowered down.
Figure 3:
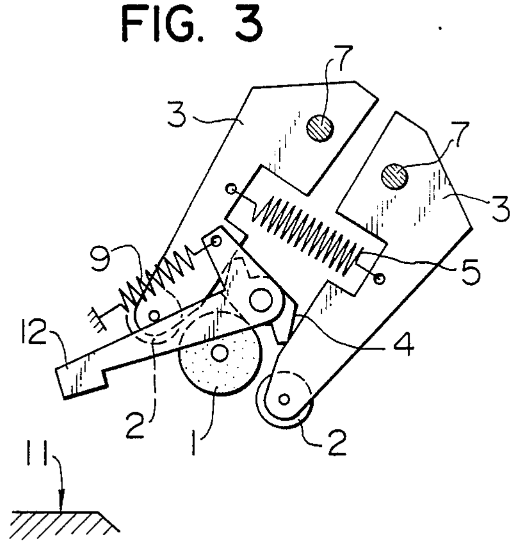
FIG. 3 is a schematic side view illustrating the depression release lever and its relating parts of a first embodiment of the present invention when the upper frame is raised upward to open the system.

FIGS. 1 and 2 are schematic side views illustrating the cam and the depression/release lever and their related parts of a thermal printing system of the present invention when the upper frame is closed with respect to the lower frame, and showing the pinch rollers being depressed, namely, urged toward the platen, while FIG. 3 depicts the cam and the depression/release lever and their relating parts, where the upper frame is opened with respect to the lower frame.

Figure 4:
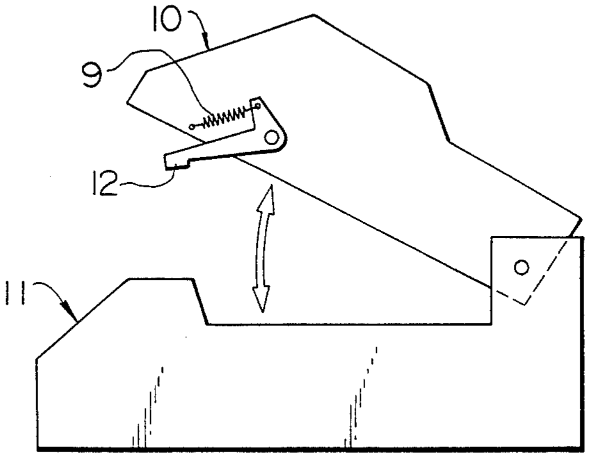
FIG. 4 is a side view illustrating the entire thermal printing system of a first embodiment of the present invention where the upper frame is raised upward to open the system.

FIG. 4 is a side view illustrating the entire thermal printing system of a first embodiment of the present invention where the upper frame is raised upward to open the printing system.

In the drawings, numeral 10 is an upper frame and 11 is a lower frame, and the former is attached to the latter being able to be selectively opened or closed with each other, so that the upper frame can be secured tightly to the lower frame by a locking means (not shown).

Numeral 1 is a platen and 2 is a pair of pinch rollers opposedly facing with each other and 3 denotes a pair of pinch rollers levers, and these members, together with their related parts, are attached to the platen 1.

Each of the pinch roller levers 3 is swingably received at its one end by a pinch roller lever supporting pin 7, while the other end is attached with a freely rotatable pinch roller 2, which together with the other one constitute a pair to be resiliently biased by a tension spring 5 extended between the two pieces of the pinch roller levers 3, so that the pinch rollers in a pair can be depressed on the surface of the platen 1 from its opposite side as if the rollers 2 can embrace or hold the platen 1 from the opposite sides.

In the drawings, numeral 4 is a cam and 12 denotes a crank-arm type depression-release lever for urging the pinch roller lever 3. The cam 4 is disposed between the opposedly facing pinch roller levers 3 in a pair, so that it normally does not exert any force on the pinch roller lever 3, but it acts to urge the pinch roller levers 3 to move away from each other against the tensional force imparted by the tension spring 5 when the cam is turned by a specified angle, while the lever 12 is disposed such that its front end engages with or leaves away from the lower frame 11 depend on the user's closing or opening of the upper frame.

Further, the cam 4 and the lever 12 are fixedly attached to a rotatable connecting pin 8, so the cam 4 and lever 12 can integrally rotate as a single member. In addition, the lever 12 is biased by a tension force given by a tension spring 9 to be normally turned in anticlockwise direction.

Consequently, when the upper frame 10 is closed down on the lower frame 11, the front end of the depression/release lever 12 engages with a certain part of the lower frame 11, so the lever 12 can no more rotate beyond the position under the engagement even by the resilient force given by the tension spring 9, and therefore, the cam 4 does not act on the oppositely facing pinch roller levers 3, allowing both pinch rollers to approach with each other, thus opposing pinch rollers 2 are depressed resiliently against the surface of the platen roll.

In order to prevent interference between the mating parts, sufficient clearance is secured between the cam 4 and the pinch roller levers 3.

When the upper frame 10 is raised upward to an "Open" position, the front end of the depression/release lever also leaves away from the lower frame 11, as the result, the lever 12 is allowed to rotate anticlockwise effected by the tension spring 9 together with the cam 4, thereby the cam 4, when turned by a specified angle or more, acts to widen the space between the oppositely facing pinch roller levers 3, thereby giving rise to leaving away from the two opposing pinch rollers from the depressed contact with the platen 1.

Since it is constructed as explained above, the pinch rollers 2 can be selectively depressed upon or released from the surface of the platen 1 in an interrelated manner.

In carrying out thermal printing operation, upper frame 10 is lowered down onto the lower frame 11 and then a paper sheet is fed from the cassette case. Then a desired image of information can be printed at the contact point with the platen 1 by means of thermal printing effected by the thermal head 6.

Second Embodiment

A second embodiment of the present invention will be explained by referring to FIGS. 5, 6 and 7.

Figure 5:
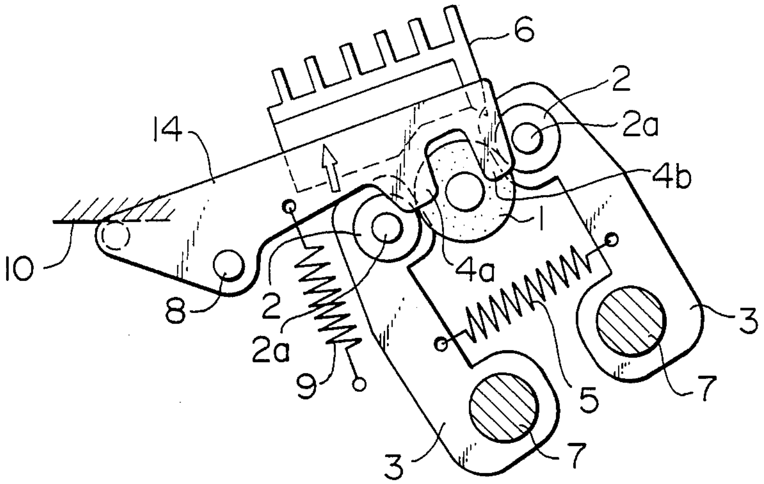
FIG. 5 is a schematic side view illustrating the depression/release lever and its relating parts of a second embodiment of the present invention when the upper frame is lowered down.
Figure 6:
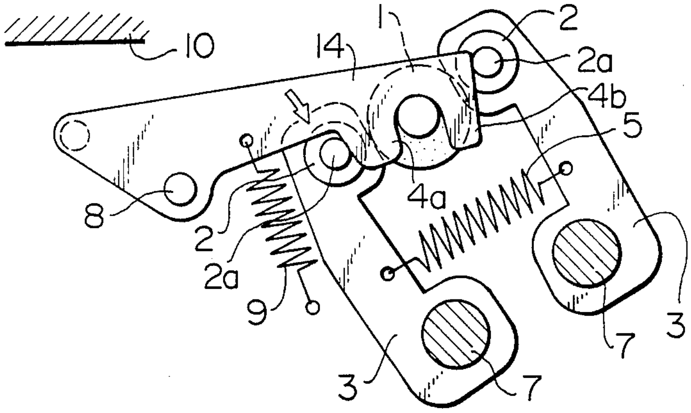
FIG. 6 is a schematic side view illustrating the depression/release lever and its relating parts of a second embodiment of the present invention when the upper frame is raised upward to open the system.
Figure 7:
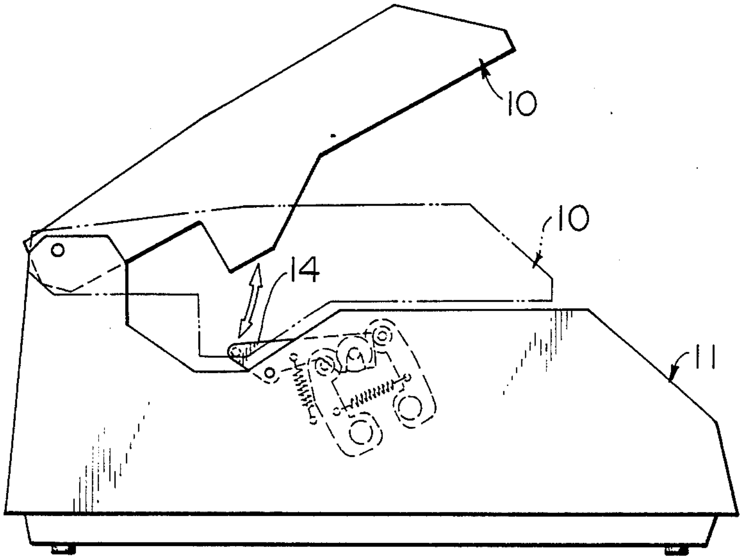
FIG. 7 is a side view illustrating the entire thermal printing system of a second embodiment of the present invention where the upper frame is raised upward to open the system.
Figure 8:
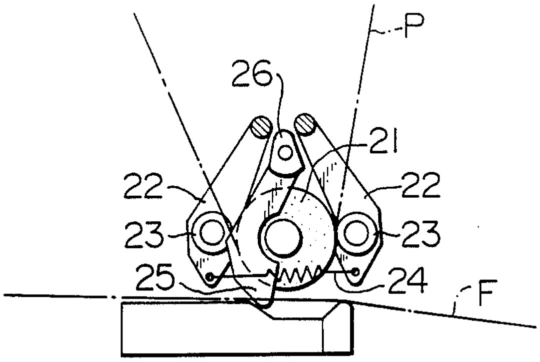
FIG. 8 PRIOR ART
FIG. 8 is a schematic side view illustrating the depression/release lever and its relating parts of a prior art thermal printing system when the upper frame is lowered down.
Figure 9:
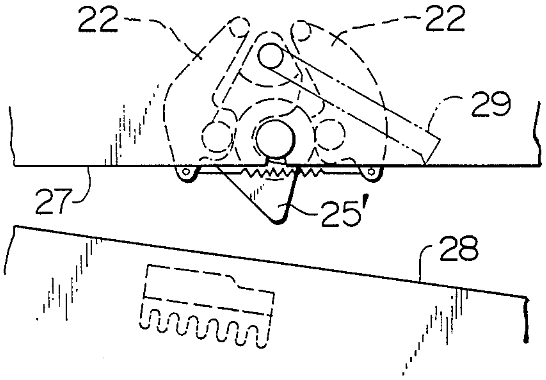
FIG. 9 PRIOR ART
FIG. 9 is a schematic side view illustrating the depression/release lever and its relating parts of another example of the prior art thermal printing system when the upper frame is lowered down.

In the first embodiment explained above, the platen, pinch rollers and related parts or components are mounted on the upper frame 10 as shown in FIGS. 2 and 3, however, these members in the second embodiments are attached to the lower frame 11 as shown in FIGS. 5, 6 and 7.

FIG. 5 is a side view showing, a depression/release lever 14 and its related parts or components, when the upper frame 10 is closed onto the lower frame.

FIG. 6 shows that they are in opened state.

FIG. 7 is a side view showing the entire profile of the thermal printing system of the present invention, and it shows that the upper frame 10 can be opened or closed with respect to the lower frame 11. The upper frame 10 shown by solid line is the state where the upper frame is opened by raising the upper frame, while that shown by dash and dot line is the upper frame 10 being closed.

In the drawings, numeral 1 is a platen, 2 and 3 are pairs of pinch rollers and pinch roller levers, respectively.

These pinch rollers and pinch roller levers in each pair are oppositely facing with each other and these members including the platen are disposed on the lower frame 11.

Each pinch roller lever 3 is rotatably disposed at its one end around a pinch roller lever supporting pin 7 and is attached with a pinch roller 2 at its other end, and both pinch rollers oppositely facing with each other are resiliently biased by a pinch roller lever tensioning spring 5 so that both pinch rollers can be pressed on the surface of the platen 1 from its opposite sides.

Numeral 14 is a depression/release lever swingably received at its intermediate portion by a supporting pin 8 disposed on the lower frame 11, while one end of the lever 14 is engageable with the lower face of the upper frame 10 and its the other end is formed with two protrusions 4*a* and 4*b* alike two cams or wedges, each of which is made engageable with the inside face of a pair of pins 2*a* for supporting each of the pair of pinch rollers 2, respectively.

When the upper frame 10 is swingably raised upward to its "Open" position with its lower face moved away from said one end of the depression/release lever as shown in FIG. 6, and the other end of the lever 14 is lowered down by the tension spring 9, thereby the cam shaped protrusions at the other end of the lever 14 are lowered down by the tension spring 9, thereby the cam shaped two protrusions 4*a* and 4*b* will engage the inside face of each of the supporting pins 2*a* which face with a respective protrusion.

As a consequence, the oppositely facing pinch roller levers 3 are urged to move away from each other, resulting in that the pinch rollers 2 are also moved away from the biased contact with the platen 1 against the resilient tension force imparted by the pinch roller tension spring 5.

When the upper frame 10 is swingably depressed down to the closed position and its lower face engages the lever 14, as shown in FIG. 5, the other end of the lever 14 is raised upward against the resilient force of the tension spring 9, this result in disengagement of the cam shaped protrusions 4*a* and 4*b* with the respective inside face of each supporting pin 2*a*, thus the two opposing pinch roller levers 3 are allowed to approach with each other against the resilient force given by the pinch roller lever tension spring 5, thereby the oppositely facing two pinch rollers 2 are able to hold and depressed the platen 1 from opposite sides.

Since the thermal printing system according to the second embodiment is constructed as explained above, pressing and releasing of the pinch rollers 2 to the platen 1 can be automatically effected either by closing or by opening the upper frame 10 to the lower frame 11.

When it is necessary to perform printing relying on the thermal printing system of this invention, it is only needed to close the upper frame 10 onto the lower frame 11 and then to feed a paper sheet. Then the fed paper sheet is printed at the point of contact with the platen 1 by the heat transmitted from the thermal head 6.

Meritorious Effects of the Invention

Even in the prior art thermal printing system, a slightly crumpled paper sheet could be removed by pulling out the paper sheet remaining outside the frame, however, a seriously crumpled paper sheet had to be taken out by opening the upper frame and manually separating the pinch rollers from their resilient engagement with a platen, while in the thermal printing system of the present invention, pinch rollers are automatically released from their engagement with the platen in connection with a user's opening motion, then the rollers can be returned to their engagement with the platen also by a user's mere closing motion of the upper frame, thereby the user of this kind of printing system can be relieved from troublesome work encountered in a conventional one. In addition, even an unskilled user can handle such a thermal printing system without the fear of involuntarily missing the use of the release lever.

What is claimed is:

1. A thermal printing system comprising:

a lower frame, an upper frame capable of being opened and closed with respect to said lower frame, a platen disposed at either one of said lower frame and upper frame, a pair of pinch rollers disposed on levers by support pins so as to be swingably urged by a resilient force and being oppositely faced with respect to each other so that both rollers of the pair are urged to press the surface of said platen from opposite sides, and wherein printing is performed by squeezing a paper sheet therebetween when said pair of pinch rollers are in a resiliently depressed state;

said thermal printing system further comprising a depression/release lever actuated in connection with a user's opening and closing of said upper frame with respect to said lower frame, whereby an opening between said pair of pinch rollers is widened against said resilient force so that a paper sheet in a crumpled state can be removed therefrom.

2. A thermal printing system as claimed in claim 1, wherein said platen and said pair of pinch rollers are received in said upper frame, and said depression/release lever together with a cam are rotatably received at one end by a supporting pin disposed at an intermediate portion between said pair of pinch rollers levers, and the other end of said lever allows said cam to rotate when said upper frame is raised upward to an open position so that the opening between said pair of pinch rollers is widened against said resilient force, thereby enabling a crumpled paper sheet to be removed, while said lever restricts the movement of said cam and lets said pair of pinch rollers approach together to be pressed on the surface of said platen by said resilient force ready for feeding a paper sheet for printing.

3. A thermal printing system as claimed in claim 1, wherein said platen and said pair of pinch rollers are received in said lower frame, and said depression/release lever is rendered engageable at one end with a part of said upper frame, and is swingable received by a support pin at an intermediate portion, and the other end of said lever is rendered engageable with an inside face of each support pin of said pair of pinch rollers, whereby when said upper frame is raised upward to an open position, the other end of said depression/release lever is placed in contact with said inside face of each support pin of said pair of pinch rollers and widens the opening between said pair of pinch rollers against said resilient force and enabled the crumpled paper sheet to be removed, while said one end of said lever restricts the movement of said other end to engage the inside faces of said pair of support pins of said pinch rollers when said upper frame is lowered to close the upper frame so that the pair of pinch rollers are allowed to approach together and are pressed on the surface of said platen by said resilient force ready for feeding a paper sheet for printing.

4. A thermal printing system as claimed in claim 2, wherein said depression/release lever is disposed so that its front end can move away from or engage with said lower frame in connection with the opening or closing respectively, of said upper frame, and is provided with a cam coupled by a connecting pin to said depression/release lever, and said cam normally does not act on said pinch roller levers, but is rotatably received by a supporting pin disposed at the intermediate portion between said pair of pinch roller levers, and the other end of said lever allows said cam to rotate when said upper frame is raised upward to take an open position so that the opening between said pair of pinch rollers is widened against said resilient force thereby enabling the crumpled paper sheet to be removed while said lever restricts the movement of said cam and lets said pair of pinch rollers approach together and be pressed on the surface of said sheet for printing.

5. A thermal printing system as claimed in claim 3, wherein the other end of said depression/release lever has cam or wedge like protrusions and advances and acts to widen the space between said oppositely facing pair of pinch rollers against a pinch roller tensioning spring, and releases the pinch rollers from their contact with said platen when said upper frame is swingably raised upward to its open position, while the other end of said depression/release lever is restricted from advance movement so that said cam or wedge like protrusions can move away from the contact with said pair of pinch roller supporting pins and allow said pair of pinch rollers to move to approach each other and resiliently contact the surface of said platen when said upper frame is lowered to its closed position; whereby pressing and releasing of said pinch rollers on the platen is effected automatically in connection with a user's closing and opening of said upper frame with respect to the lower frame.

* * * * *

UNITED STATES PATENT AND TRADEMARK OFFICE
CERTIFICATE OF CORRECTION

PATENT NO. : 4,947,185

DATED : August 7, 1990

INVENTOR(S) : MITSUSHIMA et al

It is certified that error appears in the above-identified patent and that said Letters Patent is hereby corrected as shown below:

On the cover page, Item [54], "CRUMBLED" should read --CRUMPLED--.

Column 1, line 2, "CRUMBLED" should read --CRUMPLED--;
line 33 "in advancecd" should read --is advanced--;
line 39, "Through" should read --Though--;
lines 62 - 63, "pinch levers" should read --pinch roller levers--.

Column 3, line 44, "virture" should read --virtue--.

Column 6, line 48, "depressed" should read --pressed--.

Column 8, line 8, "enabled" should read --enables--.

Signed and Sealed this

Twenty-fifth Day of February, 1992

*Attest:*

HARRY F. MANBECK, JR.

*Attesting Officer* *Commissioner of Patents and Trademarks*